(12) United States Patent
Taich et al.

(10) Patent No.: US 7,782,929 B2
(45) Date of Patent: Aug. 24, 2010

(54) MULTIPLE TRANSMISSION PROTOCOL TRANSCEIVER

(75) Inventors: Dimitry Taich, Cupertino, CA (US); Jose Tellado, Palo Alto, CA (US)

(73) Assignee: Teranetics, Inc., San Jose, CA (US)

( * ) Notice: Subject to any disclaimer, the term of this patent is extended or adjusted under 35 U.S.C. 154(b) by 272 days.

(21) Appl. No.: 11/510,934

(22) Filed: Aug. 28, 2006

(65) Prior Publication Data

US 2008/0049818 A1    Feb. 28, 2008

(51) Int. Cl.
*H04B 1/38* (2006.01)
*H04L 5/16* (2006.01)

(52) U.S. Cl. .................. 375/222; 375/328; 375/354; 375/219; 370/395.5

(58) Field of Classification Search ............. 375/219, 375/222
See application file for complete search history.

(56) References Cited

U.S. PATENT DOCUMENTS

| | | | | |
|---|---|---|---|---|
| 4,970,637 A * | 11/1990 | Sato | ......................... | 708/207 |
| 6,052,364 A * | 4/2000 | Chalmers et al. | ........... | 370/312 |
| 6,091,765 A * | 7/2000 | Pietzold et al. | ............. | 375/219 |
| 6,272,430 B1 * | 8/2001 | Krasner | ...................... | 701/207 |
| 6,671,799 B1 * | 12/2003 | Parthasarathy | ............. | 712/241 |
| 6,775,706 B1 * | 8/2004 | Fukumoto et al. | ........... | 709/230 |
| 7,010,025 B1 | 3/2006 | Helfenstein et al. | | |
| 7,038,533 B2 | 5/2006 | Behzad et al. | | |
| 7,085,285 B2 | 8/2006 | Liu | | |
| 7,145,918 B2 * | 12/2006 | Feng | ......................... | 370/468 |
| 7,236,163 B2 * | 6/2007 | Yoo | ........................... | 345/213 |
| 7,616,707 B2 * | 11/2009 | Jin | ............................. | 375/316 |
| 2005/0018784 A1 | 1/2005 | Kurobe et al. | | |
| 2006/0010185 A1 * | 1/2006 | He | ............................. | 708/290 |
| 2006/0045212 A1 * | 3/2006 | Ishii et al. | ................... | 375/340 |

* cited by examiner

*Primary Examiner*—Shuwang Liu
*Assistant Examiner*—Lihong Yu
(74) *Attorney, Agent, or Firm*—Brian R. Short

(57) ABSTRACT

A method and apparatus for receiving one of a plurality of Ethernet transmission protocol signals is disclosed. Each transmission protocol signal includes a plurality of transmission signal streams. The method includes determining which of the transmission protocol signals is being received. An analog front-end processor is connected to one of a plurality of protocol digital processors based on the transmission protocol signal being received. A setting of at least one functional parameter of the analog front-end processor and/or the protocol digital processors is selected based on the transmission protocol signal being received. A sampling rate of the analog front-end processor and/or a processing rate of the protocol digital processors are selected based on the transmission protocol signal being received. The plurality of transmission signal streams of the transmission protocol signal being received by the analog front-end processor are ADC sampled based on a shared clock source.

20 Claims, 6 Drawing Sheets

MULTIPLE TRANSMISSION PROTOCOL TRANSCEIVER

FIELD OF THE INVENTION

The invention relates generally to communication systems. More particularly, the invention relates to a multiple transmission protocol transceiver.

BACKGROUND OF THE INVENTION

High-speed networks are continually evolving. The evolution includes a continuing advancement in the operational speed of the networks. The network implementation of choice that has emerged is Ethernet networks physically connected over twisted pair wiring. Ethernet in its BASE-T forms is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates, such as specified by 10GBASE-T.

As the technology evolves to high transmission data rates through evolutionary protocols, it is desirable to be able to support multiple protocols so that devices with previously existing protocols can still be supported.

It is desirable to have an apparatus and method of receiving and transmitting multiple data rate signals while minimizing the amount of electronic circuitry required.

SUMMARY OF THE INVENTION

An embodiment includes a method of receiving one of a plurality of Ethernet transmission protocol signals. Each transmission protocol signal includes a plurality of transmission signal streams. The method includes determining which of the transmission protocol signals is being received. An analog front-end processor is connected to one of a plurality of protocol digital processors based on the transmission protocol signal being received. A setting of at least one functional parameter of the analog front-end processor and/or the protocol digital processors is selected based on the transmission protocol signal being received. A sampling rate of the analog front-end processor and/or a processing rate of the digital processors is selected based on the transmission protocol signal being received. The plurality of transmission signal streams of the transmission protocol signal being received by the analog front-end processor are ADC sampled based on a shared clock source.

Another embodiment includes a method of transmitting one of a plurality of transmission protocol signals. Each transmission protocol signal includes a plurality of transmission signal streams. The method includes determining which of the transmission protocol signals are to be transmitted. An analog front-end processor is connected to one of a plurality of protocol digital processors based on the transmission protocol signal being transmitted. A setting of at least one functional parameter of at least one of the analog front-end processor of the protocol digital processors is selected based on the transmission protocol signal being transmitted. A sampling rate of the analog front-end processor and/or a processing rate of the digital processors is selected based on the transmission protocol signal being transmitted. The plurality of transmission signal streams of the transmission protocol signal being transmitted by the analog front-end processor are digital to analog converted based on a shared clock source.

Other aspects and advantages of the present invention will become apparent from the following detailed description, taken in conjunction with the accompanying drawings, illustrating by way of example the principles of the invention.

DETAILED DESCRIPTION

The invention includes an apparatus and method for providing connection of multiple transmission protocol digital processors to a single analog processor. Each of the transmission protocol digital processors provide support of transmission of a transmission protocol having a transmission data rate that is different than the data rate of the other transmission protocols. The analog processor is designed to support all of the transmission protocols. However, the design can be optimized for the highest data rate transmission protocol, and lower data rate transmission protocols can be accommodated. The sampling and processing speeds required by the highest data rate transmission protocol can be used to provide additional processing of the transmission signals of the lower speed transmission protocols that may be required due to accommodation of the highest data rate transmission protocol.

The design of the architecture of the analog processor can be optimized for the highest data rate transmission protocol. The lower data rate transmission protocols can be given a lower priority than the highest data rate transmission protocol during the design of the analog processor. However, the higher sampling and processing speeds of the highest data rate can be used to provide processing gain for the lower speed data rate protocols.

Figure 1:
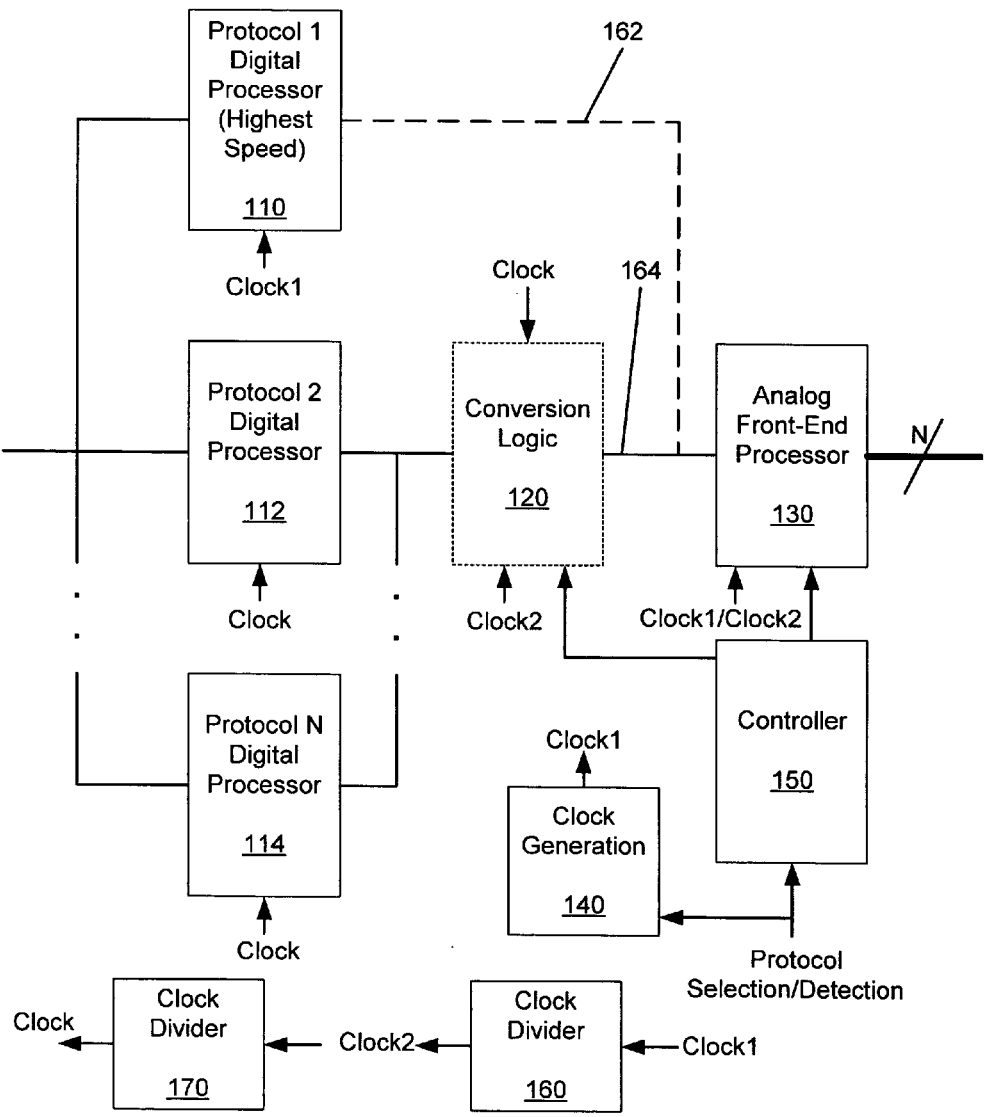
FIG. 1 shows a block diagram of a transmission system that includes multiple transmission protocol digital processors and a single analog front-end processor.

FIG. 1 shows a block diagram of a transmission system that includes multiple transmission protocol digital processors 110, 112, 114 and a single analog front-end processor 130. The transmission system is generally included within a transceiver that supports transmission of a transmission protocol signal that can be one of multiple transmission protocols. For example, the transmission protocol signal can be transmitted according to 100BASE-T, 1000BASE-T and 10GBASE-T transmission protocols. These protocols have similar electrical transmission specifications. Receive path parameters vary, but still allow a single analog front-end processor that supports a superset of the required receiver parameters. The critical parameters can be optimized for the highest data rate setting (10GBASE-T). The transmission system of FIG. 1 depicts a generic system that can be used for either transmission or reception of the transmission protocol signal.

As shown at the input/output of the analog front-end processor 130, the transmission protocol signal can include N transmission signal streams. Each of the N transmission signal streams can be associated with a separate transmission channel cable pair. Each separate cable can be, for example, a 4 twisted pairs of copper cable. The transmission for each transmission protocol can be full or half duplex.

In a reception mode, the analog front-end receives at least one, but no more than N transmission signal steams depending upon the transmission protocol of the transmission protocol signal being received. For example, if the transmission protocol is 100BASE-T, then the transmission protocol signal includes two transmission signal streams (one for transmission, and one for reception) and the transmission is half-duplex. If the transmission protocol is 1000BASE-T, then the transmission protocol signal includes four bi-directional transmission signal streams and the transmission is full-duplex. If the transmission protocol is 10GBASE-T, then the transmission protocol signal includes four bi-directional transmission signal streams and the transmission is full-duplex. The 10GBASE-T transmission protocol has a higher symbol rate than 1000BASE-T transmission protocol.

A determination is made of the transmission protocol (as controlled by the Protocol Selection/Detection control signal of FIG. 1) of the signal being received. The data rate of each of the transmission protocols is different. The transmission protocol is used to determine various settings of the analog front-end processor 130 and/or various settings of the protocol digital processors 110, 112, 114. The settings can include, for example, the sampling rate of the analog front-end processor 130, the processing rate of the digital processors 112, 114, the dynamic range of the analog front-end processor 130, anti-aliasing filtering and/or sampling phase adjustments of the analog front-end processor 130.

For an exemplary embodiment of the transmission system, the connections between and the processing of the analog front-end processor 130 and/or the protocol digital processors 110, 112, 114 are optimized for the highest data rate transmission protocol signal. For example, during design, the architecture of the transmission system can be optimized for 10GBASE-T protocol signals, but also be adaptable for adjustments necessary for 100BASE-T and 1000BASE-T protocol signals. The highest data rate transmission protocol typically requires faster sampling and processing than the lower data rate transmission protocols.

An embodiment of the single analog front-end processor 130 includes a bandwidth that is wide enough to support the highest data rate transmission protocol signal. This embodiment further includes maintaining the bandwidth (associated with the highest-speed protocol supported) while the lower data rate transmission protocols are used. As a result, additional processing may be required for the lower data rate transmission protocols due to the additional noise and aliasing caused by the wide bandwidth of the analog front-end processor. However, the capabilities of the faster sampling and processing can be used to enhance the reception and transmission of the lower data rate transmission protocol signals. That is, for example, the lower data rate transmission protocol signals can include over-sampling. For over-sampling, the sampling rate should be greater than the symbol rate of the transmission signals. The over-sampling can be used for additional processing of the lower data rate transmission protocol signals. For example, over-sampling allows for digitally reconstructing nearly-optimal sampling phases of the lower data rate transmission protocol signals. The over-sampling can be used to compensate for the additional noise and anti-aliasing introduced to the lower data rate transmission protocol signals due to the additional bandwidth of the analog front-end processor 130. Additionally, the over-sampling can be used in the generation of an echo cancellation signal. Embodiments of an analog echo-canceller can include negatively summing a replica of the transmitted signal with the received signal. Over-sampling enables additional filtering of the replica signal that modifies the phase and amplitude of the replica signal, thereby providing a better match between the differences of the main transmit path and the replica path. The additional filtering improves echo cancellation.

As shown in FIG. 1, the highest speed digital processor 110 can operate at the same rate or frequency as the analog front-end processor 130. That is, the digital processor 110 can be connected directly to the analog front-end processor 130. However, the other digital processors 112, 114 can operate at different rates or frequencies. Conversion logic 120 can be included to provide a transition between the analog front-end processor 130 and the digital processors 112, 114.

A clock generation circuit 140 generates a clock signal CLOCK1 that can be used for the sampling rate of the analog front-end processor 130 and for clocking of the highest speed digital processor 110. Lower frequency clocks (CLOCK2, CLOCK) can be generated by clock dividers 160, 170. For a 10GBASE-T, 1000BASE-T, 100BASE-T transceiver, the clock frequency of the CLOCK1 can be 800 MHz, the frequency of the CLOCK2 can be 250 MHz (or 500 MHz) and the frequency of the CLOCK can be 125 MHz. The CLOCK2 can be used to clock the conversion logic 120, the analog front-end processor 130, and the CLOCK can be used to clock the digital processors 112, 114 and the conversion logic 120. An embodiment of the conversion logic 120 will be described in greater detail.

A high-speed data path 162 provides a data path for the highest data rate protocol and can be clock, for example, by the highest speed clock, the first clock CLOCK1. A lower speed path 164 provides a data path for the lower data rate protocols and can be clocked, for example, by the lower speed clock, the second clock CLOCK2.

The analog front-end processor can include both ADC(s) and DAC(s) for reception and transmission of signals. The ADC(s) and DAC(s) can be clocked with the CLOCK1 clock or the CLOCK2 clock. Additionally, a set of ADC(s) that receive the N transmission signal streams can be clocked based on a shared clock source That is, the clock provided can be a shared clock source, wherein each individual ADC sampling clock can be modified, for example, in phase. Similarly, the clock for the DAC(s) that transmit the N transmission signal can be based on the shared clock source.

Figure 2:
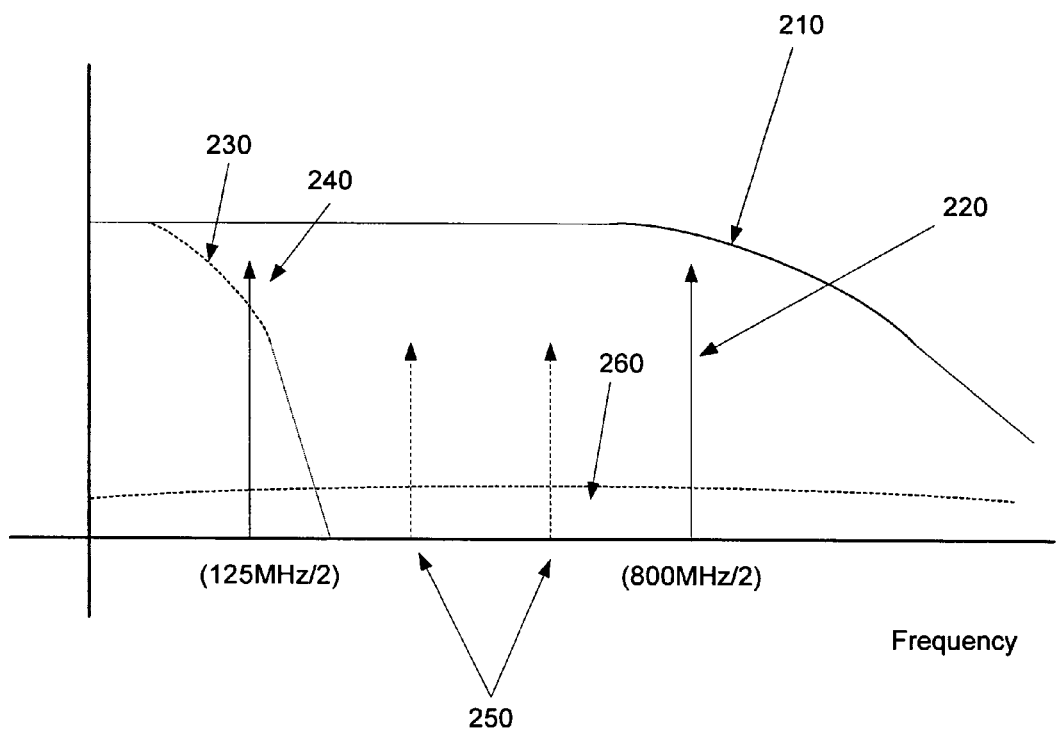
FIG. 2 shows a frequency spectrum of a wide-bandwidth filter and Nyquist sampling rates for various data rate transmission protocols.

FIG. 2 shows a frequency response of a wide-bandwidth filter and Nyquist sampling rates for various data rate transmission protocols. Curve 210 shows a frequency response of an analog front-end processor at a highest data rate transmission protocol. For a 10GBASE-T transmission protocol, the bandwidth is about 400 MHz. A sampling rate 220 of 800 MHz can be used. However, when using a sampling rate 240 of 125 MHz, the sampled signal suffers from anti-aliasing signals 250, and is subjected to additional noise 260 due to the high bandwidth of the analog front-end processor. The aliasing components and additional noise can be digitally filtered by using over-sampled versions of the lower data rate transmission protocols signals (such as, 1000BASE-T and 100BASE-T). Curve 230 shows a desired filter bandwidth provided by digital processing.

Figure 3:
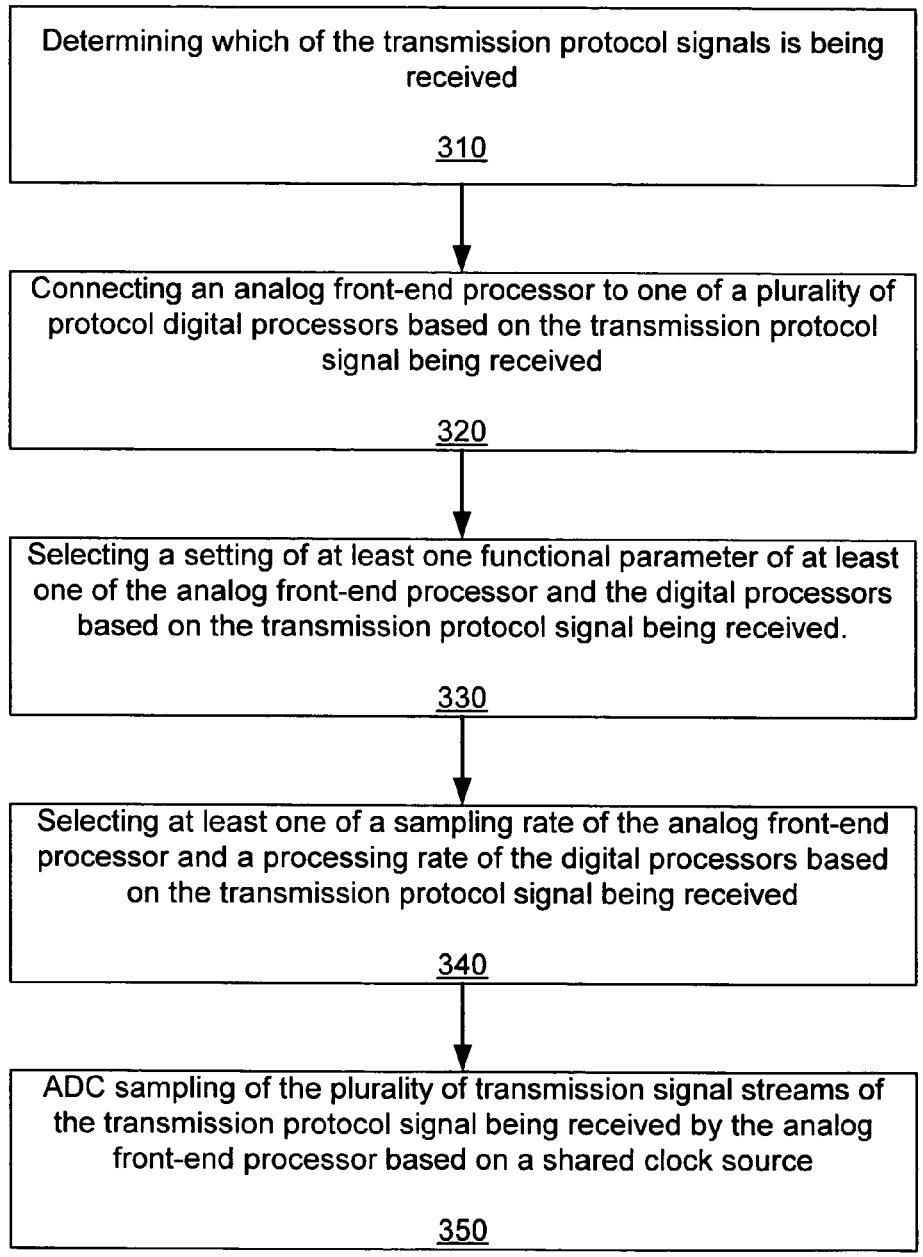
FIG. 3 is a flow chart showing one example of a method of receiving a plurality of transmission protocol signals.

As previously described, the transmission system advantageously includes the signal analog front-end which supports the different transmission protocols. FIG. 3 is a flow chart showing one example of a method of receiving a plurality of transmission protocol signals with, for example, the transmission system of FIG. 1. Each transmission protocol signal includes a plurality of transmission signal streams. A first step 310 includes determining which of the transmission protocol signals is being received. A second step 320 includes connecting an analog front-end processor to one of a plurality of protocol digital processors based on the transmission protocol signal being received. A third step 330 includes selecting a setting of at least one functional parameter of at least one of the analog front-end processor and the digital processors based on the transmission protocol signal being received. A fourth step 340 includes selecting at least one of a sampling rate of the analog front-end processor and a processing rate of the digital processors based on the transmission protocol signal being received. A fifth step 350 includes ADC sampling of the plurality of transmission signal streams of the transmission protocol signal being received by the analog front-end processor based on a shared clock source. It is to be understood that the steps of FIG. 3 do not have to occur in the sequence shown.

The transmission protocol can be determined, for example, through an Ethernet auto-negotiation process. Another example of a method of determining the transmission protocol includes sampling received signal energy at key frequencies, and deducing the transmission protocol. For example, sampling at a frequency that is equivalent to half the Nyquist rate of each of the transmission protocol will provide enough information to determine the transmission protocol.

Based on the transmission protocol being used, the analog front-end is interfaced with a corresponding protocol digital processor. For example, if a 10GBASE-T transmission protocol is selected, the analog front-end is interfaced with a 10GBASE-T digital processor.

Based on the transmission protocol, a setting of one or more functional parameter is selected. For example, a dynamic range of the analog front-end processor, a sampling frequency of the analog front-end processor, and/or a sampling phase of the analog front-end processor can be adjusted.

Due to the high sampling rate required by the highest data rate transmission protocol, the lower data rate transmission protocol signals can be over-sampled. This allows separate reconstruction the sampling phase for each transmission signal streams received by the analog front-end processor. Additionally, anti-aliasing filtering an out-of-band noise rejection corresponding with the transmission protocol signal being received can be based on the transmission signal protocol.

An exemplary embodiment of digitally reconstructing the sampling phase includes generating new samples from original samples for the purpose of improving a signal to noise ratio (SNR) of the processed protocol signal, or, for example, providing anti-aliasing filtering. The over-sampled signals can be digitally processed to adjust the effective sampling phase of the processed protocol signals.

Figure 4:
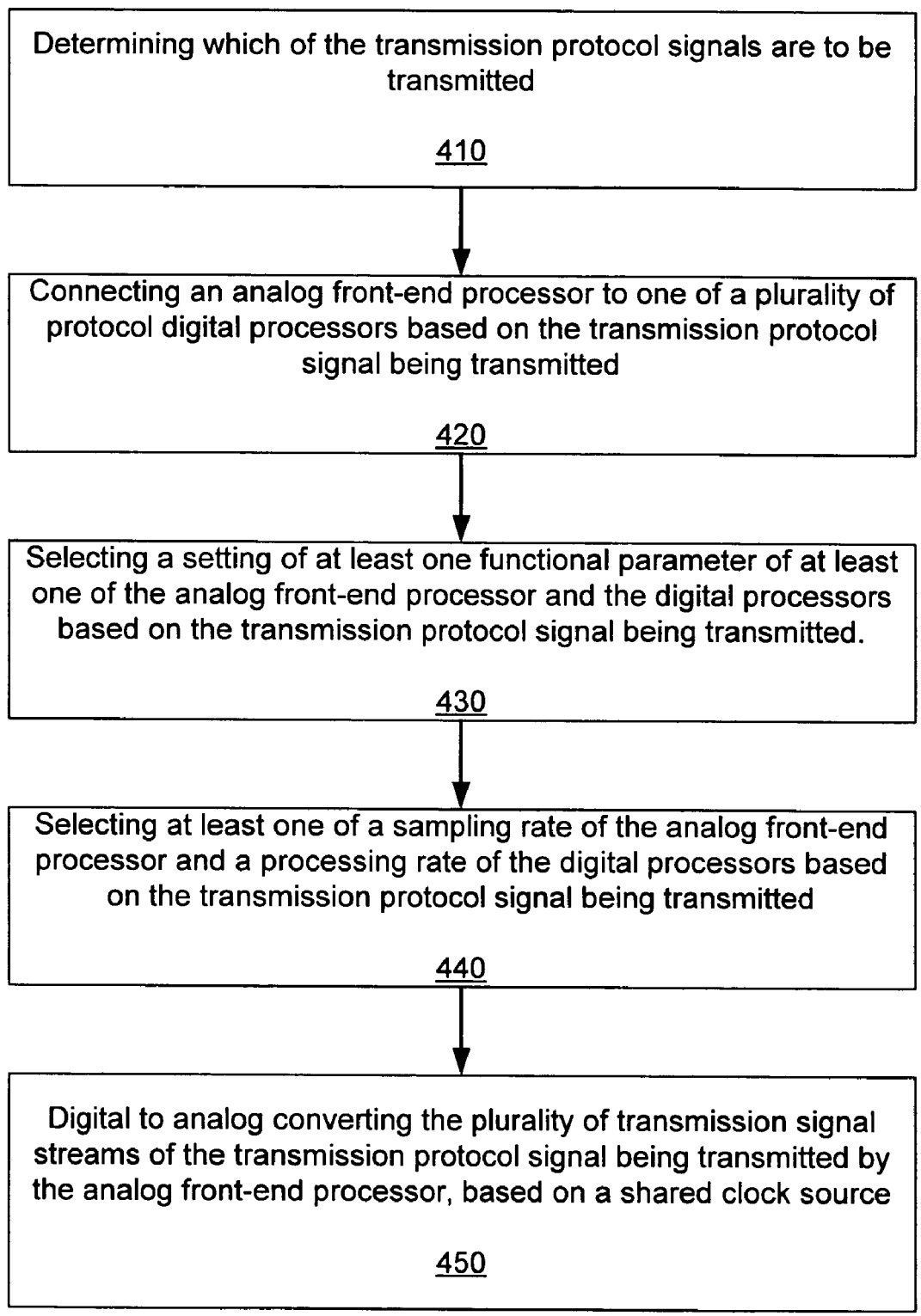
FIG. 4 is a flow chart showing one example of a method of transmitting a plurality of transmission protocol signals.

FIG. 4 is a flow chart showing one example of a method of transmitting a plurality of transmission protocol signals. Each transmission protocol signal includes a plurality of transmission signal streams. A first step 410 of the method includes determining which of the transmission protocol signals are to be transmitted. A second step 420 includes connecting an analog front-end processor to one of a plurality of protocol digital processors based on the transmission protocol signal being transmitted. A third step 430 includes selecting a setting of at least one functional parameter of at least one of the analog front-end processor and the digital processors based on the transmission protocol signal being transmitted. A fourth step 440 includes selecting at least one of a sampling rate of the analog front-end processor and a processing rate of the digital processors based on the transmission protocol signal being transmitted. A fifth step 450 includes digital to analog converting the plurality of transmission signal streams of the transmission protocol signal being transmitted by the analog front-end processor, based on a shared clock source.

Settings of the analog front-end processor that can be selected include adjusting a dynamic range of the analog front-end processor, adjusting a frequency bandwidth of the analog front-end processor, and/or adjusting a clocking phase of the analog front-end processor.

Figure 5:
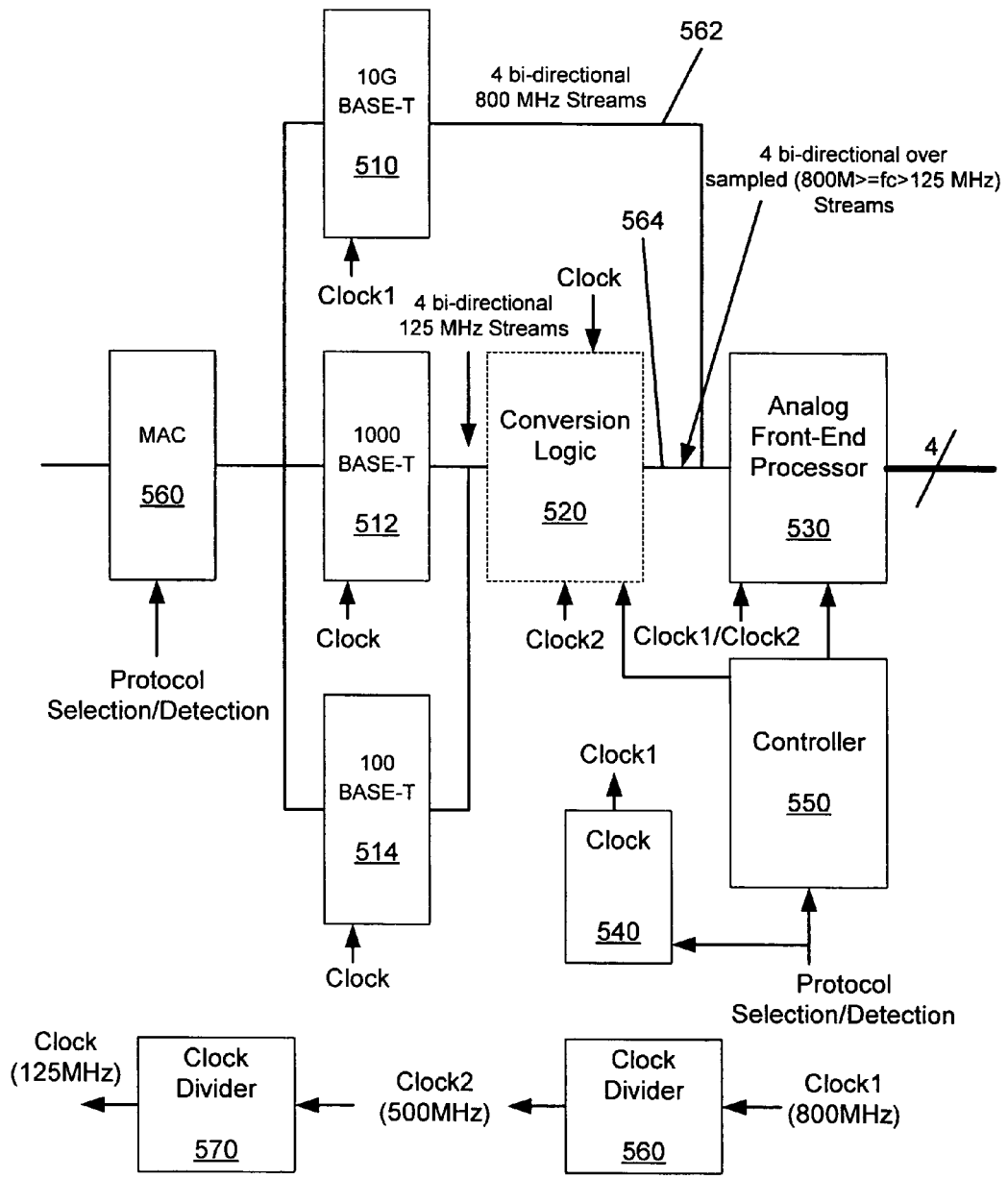
FIG. 5 shows a more detailed block diagram of a transmission system that includes multiple transmission protocol digital processors and a single analog front-end processor.

FIG. 5 shows a more detailed block diagram of a transmission system that includes multiple transmission protocol digital processors 510, 512, 514 and a single analog front-end processor 530. This transmission system can be used for methods of receiving multiple transmission protocol signals, or transmitting multiple transmission protocol signals. The transmission protocol digital processors include a 10GBASE-T protocol digital processor 510, a 1000BASE-T protocol digital processor 512, and a 100BASE-T protocol digital processor 514.

The analog front-end processor 530 is connected to the 10GBASE-T protocol processor 510 with a shared high-speed bus 562. The signals between the analog front-end processor 530 and the 10GBASE-T protocol processor 510 are four 800 MHz bi-directional streams. The signals between the analog front-end processor 530 and the 1000BASE-T protocol processor 512 are four bi-directional streams which can be passed through conversion logic 520, and which are only required to be 125 MHz. The signals between the analog front-end processor 530 and the 100BASE-T protocol processor 514 are two one-directional streams that are only required to be 125 MHz. The frequency variations between the 10GBASE-T signals and the 1000BASE-T, 100BASE-T signals are due to the varying baud rates required by the different transmission protocol signals. As a result, the 1000BASE-T, 100BASE-T signals can include signals having frequencies greater than the required 125 MHz, therefore, allowing over-sampling of the signals.

The high-speed data bus 562 provides a data path for the highest data rate protocol and can be clocked, for example, by the highest speed clock, the first clock CLOCK1. A lower speed bus 564 provides a data path for the lower data rate protocols and can be clocked, for example, by the lower speed clock, the second clock CLOCK2.

A clock generation circuit 540 generates a clock signal CLOCK1 that can be used for the sampling rate of the analog front-end processor 530 and for clocking of the 10GBASE-T processor 510. Lower frequency clocks (CLOCK2, CLOCK) can be generated by clock dividers 560, 570. For a 10GBASE-T, 1000BASE-T, 100BASE-T transceiver, the clock frequency of the CLOCK1 can be 800 MHz, the frequency of the CLOCK2 can be 250 MHz (or 500 MHz) and the frequency of the CLOCK can be 125 MHz. The CLOCK2 can be used to clock the conversion logic 520 and the analog front-end 530. The CLOCK can be used to clock the digital processors 512, 514, and the conversion logic 520. It is desirable that the frequency of the second clock CLOCK2 be higher than the Nyquist rate of the lower data rate transmission protocols (1000BASE-T, 100BASE-T), to allow for efficient anti-aliasing and to allow for the implementation of nearly optimal sampling phase reconstruction algorithms. Additionally, it is desirable that the frequency of the second clock CLOCK2 be a digital multiple of the baud rate of the lower data rate transmission protocols (1000BASE-T, 100BASE-T), so that digital processors 512, 514 can be seamlessly synchronized with the conversion logic 520. Additionally, the MAC (described later) interface logic can be synchronized with the protocol processors 510, 512, 514 if the second clock CLOCK2 is a digital multiple of the baud rate. For 1000BASE-T and 100BASE-T transmission protocols, this can be a rate of 250, 375 or 500 MHz. The 250 and 500 MHZ frequencies may be more desirable because they are power of two multiples of 125 MHz, and therefore, allow simple 125 MHz clock generation with a symmetrical duty cycle. The lower frequency second clock CLOCK can be used for the lower data rate protocol processors 512, 514.

The clock frequencies provided are as exemplary. It is possible for the clocking of the analog front-end processor 530 to be any one of the provided clock frequencies (800, 500, 250, 125 MHz). Additionally, the clocking of the conversion logic can be any one of 500, 250, 125 MHz, and the clock frequency of the digital processors 512, 514 can be any one of 250, 125 MHz. An embodiment includes the clocking of the analog front-end processor 530 being different for the receiving circuits than for the transmitting circuits.

As shown in FIG. 5, the 10GBASE-T digital processor 510 can operate at the same rate or frequency as the analog front-end processor 530. That is, the digital processor 510 can be connected directly to the analog front-end processor 530. However, the other digital processors 512, 514 can operate at different rates or frequencies. Conversion logic 520 is included to provide a transition between the analog front-end processor 530 and the digital processors 512, 514.

The data bus between the MAC 560 and the protocol digital processors 510, 512, 514 can be either a digital bus or an analog bus. Exemplary digital buses include XGMII, GMII, RGMII or MII. Exemplary analog buses include XFI or XAUI.

Data bus selection can be made based on the selected transmission protocol, but can also consider specific application requirements. Efficient sharing of the digital bus is possible, thereby avoiding unnecessary interconnections between integrated circuits, and reducing logic circuitry.

Although the 10GBASE-T protocol is significantly different than 1000BASE-T and 100BASE-T, it still uses four twisted pairs of copper cable for full-duplex communication, and therefore, efficient reuse of the analog front-end for all three protocols can be realized. The 10GBASE-T protocol has the highest data and baud rates and provides the most challenging analog front-end performance requirements. Therefore, if trade-offs are required between the protocols, the 10GBASE-T protocol is afforded the greatest weight. A 10GBASE-T compliant analog front-end provides significant performance margins when operated in either 1000BASE-T or 100BASE-T protocols, and adjusted accordingly.

Due to the fact that they have a shared baud rate (the baud rate for 100BASE-T and 1000BASE-T is 125 MHz), the lower-frequency protocol digital processors 512, 514 can share significant portions of electronic logic circuits, such as, feed-forward, decision-feedback equalizers, cross-talk cancellers and timing tracking.

The over-sampling of the lower data rate transmission protocol signals provides for several advantageous processing capabilities. For example, it allows for the implementation of efficient digital interpolators for nearly optimal sampling phase estimation, and provides additional processing gain in the 1000BASE-T and 100BASE-T modes.

An exemplary embodiment of a transceiver that can utilize the embodiments described includes a plurality of transmission protocol processors, and analog front-end processing and conversion logic. The analog front-end enables transmission and reception of Ethernet analog signals. The analog front-end is connectable to one of the plurality of protocol processors depending upon a detected transmission protocol, wherein the analog signals include a plurality of digital streams which are sampled or clocked by the analog front-end with a shared sampling clock. The sampling clock has a highest rate when the transceiver detects a highest data rate transmission protocol, and the sampling clock has a lower rate when the transceiver detects a lower data rate transmission protocol. The conversion logic for receives or provides samples with the analog front-end processor when the transceiver detects the lower data rate transmission protocols, and adjusts a rate of the samples to match a processing rate of lower rate transmission protocol processors.

Anti-Aliasing Filtering and Down-Sampling

Anti-aliasing filters are typically utilized to limit the bandwidth of a received signal to approximately twice the sampling rate, thereby allowing the Nyquist sampling rate to be satisfied. Signal frequencies above the Nyquist sampling rate need to be rejected in order to obtain an unambiguous interpretation of the signal being sampled. Therefore, the desired anti-aliasing filter rejects all signal frequencies above the Nyquist sampling rate.

The 10GBASE-T transmission protocol requires (per Nyquist) a sampling rate of at least 800 MHz. Therefore, the bandwidth of the analog front-end processor should be at least (800/2) MHz. However, when a lower data rate transmission protocol is selected (such as 1000BASE-T or 100BASE-T) the processing rate can be reduced to, for example, the previously suggested multiple of 125 MHz. More specifically, the processing rate can be 250 or 500 MHz which are lower frequencies than the 800 MHz sampling rate of the analog front-end.

Setting the analog front-end processor at 800 MHz exclusively, that is non-adjustable, provides for an analog front-end processor that can be designed to be optimized for the highest data rate transmission protocol. However, digital anti-aliasing filtering is required for the lower frequency transmission protocol signals. Digital processing at 250 MHz provides over-sampling of the lower data rate transmission protocols (1000BASE-T and 100BASE-T) which provides the advantages of over-sampling, more specifically, efficient implementation of anti-aliasing filtering. Digital processing at 500 MHz can provide even more digital processing advantages.

Over-sampling anti-aliasing filtering typically includes down-sampling so that the rest of the digital processing can operate at the Nyquist rate. For example, the above-described 250 or 500 MHz processing can require 2:1 or 4:1 down-sampling, accordingly. Several known techniques can be used, such as, polyphase down-sampling. Simulations indicate that a 4-tap, 500 MHz filter (requiring 16 125 MHz multiplications using 4:1 polyphase down-sampling) can provide sufficient out-of-band frequency component rejection. The complexity of this type of filter is negligible compared to the rest of the logic within the transceiver.

Phase Reconstruction

An efficient transceiver implementation utilizes a single phase-locked loop for all of the transmission signal streams of each transmission protocol. However, this creates a situation in which all of the transmission signal streams are sampled with an identical phase (all of the ADCs share the same clock signal). Functionality of the transceiver can be simplified if the sampling occurs at an optimum point rather than at a random point. If over-sampling as described above is used, then the sampling of the lower data rate transmission protocols a near-optimal phase can be efficiently reconstructed digitally. An optimum phase can be digitally reconstructed when, for example, 1000BASE-T or 100BASE-T protocols are selected, and over-sampled by the analog front-end processor. Several know interpolation techniques can be used for the digital reconstruction, such as, Lagrange or Forney interpolators. As previously described, reconstruction includes generating new samples from existing samples for improving, for example, SNR of the processed signals, or providing anti-aliasing filtering.

Dynamic Range Adjustment

The different transmission protocols (such as Ethernet 10GBASE-T, 1000BASE-T or 100BASE-T protocols) require different dynamic ranges of signal amplitudes to be received and/or transmitted by the analog front-end processor. The 10GBASE-T transmission protocol includes transmission power back-off (PBO). PBO is a process in which transmission signals are attenuated at much as possible while still ensuring a desired level of signal quality at a receiver of the transmission signals. PBO help to minimize system interference due to the transmission signals. The transmission signal attenuation provided by the PBO is generally dependent upon the length of the transmission channel (that is, the length of the cable between the transmitter and the receiver). In contrast, the 1000BASE-T and 100BASE-T protocols do not employ PBO. Therefore, the 1000BASE-T or 100BASE-T protocols are transmitted with approximately the same signal amplitude independent of the length of the transmission channel. Therefore, PBO can introduce dynamic range differences between the different transmission protocols.

The different transmission protocols have different baud rates. For example, the baud rate of 10GBASE-T is a factor of 6.4 times greater than the baud rate 1000BASE-T and 100BASE-T. Therefore, the 10GBASE-T protocol signals are attenuated much more than the 1000BASE-T and 100BASE-T protocol signals. The attenuation introduces additional dynamic range differences between the different protocols, more specifically, between signals received by the analog front-end processor.

If the dynamic range of the analog front-end processor is not adjusted depending upon the transmission protocol being received, errors in the received signals can be introduced. For example, clipping of the received signals can occur, which greatly increases the BER (bit error rate) of the received signals. To help prevent clipping, an analog front-end processor that has been optimized for 10GBASE-T protocol signal reception should provide at least some attenuation of 1000BASE-T and 100BASE-T protocol signals received signals. The attenuation can be set, for example, in step 330 of the flow chart of FIG. 3.

An exemplary method of setting the dynamic range includes adjusting a gain setting with the analog front-end processor depending upon the selected transmission protocol. A fixed gain can be selected for each protocol. A specific example includes setting the gain to between 0 and −15 dB for 1000BASE-T signals, and setting the gain to between 5 and −3 dB for for 10GBASE-T signals. Additionally, an adjustable variable amount of gain can be included based, for example, on the types of cabling used.

Conversion Logic

Figure 6:
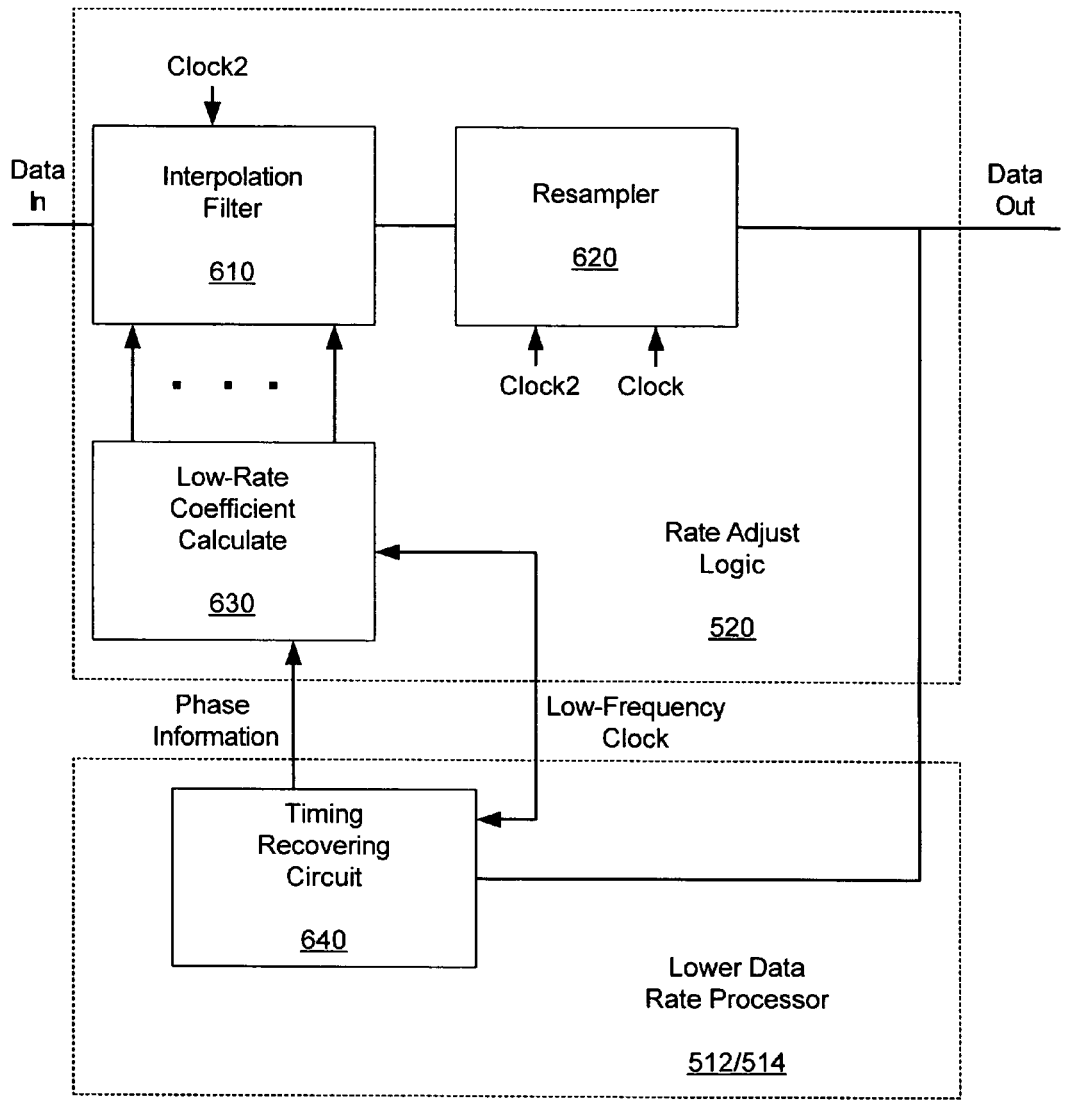
FIG. 6 shows one example of circuitry of the conversion logic of the transmission system of FIG. 5.

FIG. 6 shows an embodiment of the conversion logic 520. The conversion logic includes a high-rate interpolation filter 610, re-sampler 620, and a low-rate coefficient calculator 630. The data in is at a high rate (for example, 500 MHz) and the data out is at a lower rate (for example, 125 MHz). The interpolation filter 610 is clocked by the CLOCK2, and the re-sampler is clock by the CLOCK. The low-rate coefficient calculator 630 can be clocked by a low frequency clock. The low-frequency clock can have a frequency that is much lower than the CLOCK, CLOCK1 or CLOCK2. The low frequency clock can be generated by a timing recovery circuit 640 that is located, for example, within either of the digital processors 512, 514. The rate of the low frequency clock can be dynamically adjusted during different stages of operation. At a start-up stage, the rate can be maximized to ensure fast coefficient convergence. In a normal operation stage, the rate can be set to a much lower value to ensure tracking of analog front-end processor environmental effects, such as, temperature.

The configuration of FIG. 6 is an example. Other configurations are possible. For example, the interpolator 610 and the re-sampler 620 can be swapped so that the data in is received by the re-sampler 620 and the data out is generated by the interpolator 610.

The interpolation filter 610 generates new samples from original samples of input signal (Data In). The new samples are generated so that at least one sample per symbol has a better SNR than any of the original samples associated with the symbol.

The re-sampler 620 provides several functions. One function the re-sampler 620 provides is a sampling rate adjustment. More specifically, the input signal (Data In) includes samples having a rate as determined by the clock CLOCK2, and the output signal (Data Out) includes samples having a rate as determined by the clock CLOCK. If, for example, the frequency of the clock CLOCK2 is 500 MHz, and the frequency of the clock CLOCK is 125 MHz, the re-sampler 620 provides a 4:1 down-sampling. The input samples to the re-sampler 620 are the SNR-improved samples generated by the interpolation filter 610. Several down-sampling algorithms are available that provide efficient use of power and hardware. For example, a polyphase architecture can be used to implement multipliers of the re-sampler 620 that operate at the rate of the lower frequency clock CLOCK.

The low-rate coefficient calculator 630 generates coefficients for the high-rate interpolation filter 610. The calculation of the coefficients is based on signal phase information received from the timing recovery circuit 640. The timing recovery circuit 640 extracts timing information from the digital stream (Data Out)

The timing recovery circuit 640 can be located within the digital processors 512, 514, and controls the rate in which the corresponding digital processor receives the data out of the conversion logic 520. The timing recovery circuit 640 extracts timing information from the digital stream (Data Out) at the rate of CLOCK. This timing information consists of a rate difference between the transceiver and a link partner of the transceiver. The rate difference between the transceiver and the link partner typically occur, and detection of the difference can be used to adjust a transceiver phase-locked loop. The phase-locked loop is used to provide a share clock source that can be used to create clocks for ADC(s) and DAC(s) of the transceiver for each of the transmission signal streams. Additionally, the timing information includes information needed to perform phase reconstruction. This information is provided to the low-rate coefficient calculator 630, which in turen provides the high-rate interpolation filter with the coefficients that improve the SNR of the output data stream.

Although specific embodiments of the invention have been described and illustrated, the invention is not to be limited to the specific forms or arrangements of parts so described and illustrated. The invention is limited only by the appended claims.

What is claimed:

1. A method of receiving one of a plurality of Ethernet transmission protocol signals, each transmission protocol signal comprising a plurality of transmission signal streams, comprising:
   determining which of the transmission protocol signals is being received;
   connecting an analog front-end processor to one of a plurality of protocol digital processors based on the transmission protocol signal being received, the plurality of protocol digital processors comprising a highest speed digital processor and lower-frequency processors;
   selecting a setting of at least one functional parameter of at least one of the analog front-end processor and the protocol digital processors based on the transmission protocol signal being received;
   selecting processing rates of the protocol digital processors based on the transmission protocol signal being received, wherein the processing rate of the highest speed digital processor is selected to be a sampling rate of the analog front-end processor, and the processing rate of the lower-frequency processors is selected to be less than the sampling rate of the analog front-end processor; and
   ADC sampling of the plurality of transmission signal streams of the transmission protocol signal being received by the analog front-end processor based on a shared clock source, wherein for the lower-frequency processors, the ADC sampling comprises over-sampling the transmission signal streams of the transmission protocol signal being received, generating new samples from original samples, and digitally reconstructing a sampling phase of the over-sampled transmission signal streams.

2. The method of claim 1, wherein selecting a setting of at least one functional parameter of an analog front-end processor comprises:
   adjusting a dynamic range of the analog front-end processor.

3. The method of claim 1, wherein the analog front-end processor maintains a constant frequency bandwidth for all of the transmission protocol signals.

4. The method of claim 1, wherein selecting a setting of at least one functional parameter of an analog front-end processor comprises:
   adjusting a frequency bandwidth of the analog front-end processor.

5. The method of claim 1, wherein selecting a setting of at least one functional parameter of an analog front-end processor comprises:
   adjusting a sampling phase of the analog front-end processor.

6. The method of claim 5, further comprising selecting anti-aliasing filtering corresponding with the transmission protocol signal being received.

7. The method of claim 1, further comprising separately digitally reconstructing a sampling phase for each of the plurality of transmission signal streams received by the analog front-end processor.

8. The method of claim 1, wherein a frequency bandwidth of the analog front-end processor is fixed, and further comprising selecting digital anti-aliasing filtering corresponding with the transmission protocol signal being received.

9. The method of claim 1, wherein data rates of the plurality of protocol digital processors correspond to data rates of at least two of Ethernet 100BASE-T, 1000BASE-T and 10GBASE-T protocols, and the processing rate of the lower-frequency processors is a digital multiple of a baud rate of the transmission protocol being received.

10. An Ethernet transceiver comprising:
    a plurality of transmission protocol processors;
    an analog front-end for transmitting and receiving Ethernet analog signals, the analog front-end connectable to one of the plurality of protocol digital processors depending upon a detected transmission protocol, the Ethernet analog signals comprising a plurality of bi-directional streams which are clocked by the analog front-end based on a shared clock, wherein the shared clock has a highest rate when the transceiver detects a highest data rate transmission protocol, and the shared clock has a lower rate when the transceiver detects a lower data rate transmission protocol;
    the plurality of protocol digital processors comprising a highest speed digital processor and lower-frequency processors, wherein a processing rate of the highest speed digital processor is selected to be a sampling rate of the analog front-end processor, and the processing rate of the lower-frequency processors is selected to be less than the sampling rate of the analog front-end processor;
    the analog front-end comprising an ADC, the ADC sampling the Ethernet analog signals based on the shared clock, wherein the ADC sampling comprises sampling the Ethernet analog signals, generating new samples from original samples, and digitally reconstructing a sampling phase of the sampled Ethernet analog signals;
    conversion logic for receiving or providing samples with the analog front-end processor when the transceiver detects the lower data rate transmission protocols, and adjusts a rate of the samples to match a processing rate of the lower frequency processors.

11. The Ethernet transceiver of claim 10, wherein a processing rate of receiving conversion logic is different than a processing rate of transmitting conversion logic.

12. An Ethernet transceiver comprising:
    a plurality of transmission protocol digital processors;
    an analog front-end for transmitting and receiving Ethernet analog signals, the analog front-end connectable to one of the plurality of transmission protocol digital processors depending upon a detected transmission protocol, the analog signals comprising a plurality of bi-directional streams which are sampled by the analog front-end based on a shared clock source;
    the plurality of protocol digital processors comprising a highest speed digital processor and lower-frequency processors, wherein a processing rate of the highest speed digital processor is selected to be a sampling rate of the analog front-end processor, and the processing rate of the lower-frequency processors is selected to be less than the sampling rate of the analog front-end processor;
    wherein for the lower-frequency processors, the sampling comprises over-sampling the Ethernet analog signals, generating new samples from original samples, and digitally reconstructing a sampling phase of the over-sampled Ethernet analog signals; and wherein
    at least one of a sampling rate of the analog front-end processor and a processing rate of the transmission protocol digital processors is selected based on the detected transmission protocol; and wherein
    selecting a setting of at least one functional parameter of at least one of the analog front-end processor and the transmission protocol digital processors based on the detected transmission protocol.

13. The Ethernet transceiver of claim 12, further comprising conversion logic for receiving samples from the analog front-end processor when the transceiver detects the lower data rate transmission protocols, and adjusts a rate of the samples to match a processing rate of lower rate transmission protocol digital processors.

14. The Ethernet transceiver of claim 12, wherein adjusting at least one functional parameter of the analog front-end adjustable comprises adjusting a dynamic range of the analog front-end processor.

15. The Ethernet transceiver of claim 12, wherein adjusting at least one functional parameter of the analog front-end adjustable comprises adjusting a frequency bandwidth of the analog front-end processor.

16. The Ethernet transceiver of claim 12, wherein adjusting at least one functional parameter of the analog front-end adjustable comprises adjusting at least one of a sampling phase of the analog front-end processor, or a clocking phase of the analog front-end processor.

17. The Ethernet transceiver of claim 16, further comprising separately adjusting sampling phase for each digital stream received by the analog front-end processor.

18. The Ethernet transceiver of claim 17, further comprising separately digitally reconstructing a sampling phase for each transmission signal streams received by the analog front-end processor.

19. The Ethernet transceiver of claim 17, further comprising selecting anti-aliasing filtering corresponding with the transmission protocol signal being received.

20. The Ethernet transceiver of claim 12, wherein a frequency bandwidth of the analog front-end processor is fixed, and further comprising selecting anti-aliasing filtering corresponding with the transmission protocol signal being received.

* * * * *